United States Patent
Iwaki

(10) Patent No.: US 6,567,097 B1
(45) Date of Patent: May 20, 2003

(54) DISPLAY CONTROL APPARATUS

(75) Inventor: Tsutomu Iwaki, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/317,408

(22) Filed: May 24, 1999

(30) Foreign Application Priority Data

Jun. 25, 1998 (JP) ............................................. 10-178790

(51) Int. Cl.⁷ ............................. G09G 5/04; H04N 7/01
(52) U.S. Cl. ..................... 345/603; 345/604; 345/501; 345/547; 345/548; 348/446; 348/448; 348/526
(58) Field of Search ................................. 345/418, 604, 345/581, 589, 603, 686, 530, 501, 597, 543, 546, 547, 549, 556, 555, 127, 3, 2, 12, 89, 88, 83; 348/446, 448, 526, 527, 550, 577, 578, 552–555, 451–452, 220, 447, 910; 386/112

(56) References Cited

U.S. PATENT DOCUMENTS

| | | | | |
|---|---|---|---|---|
| 5,063,437 A | * | 11/1991 | Owashi ....................... 348/578 |
| 5,101,277 A | * | 3/1992 | Kanata ....................... 358/227 |
| 5,479,604 A | * | 12/1995 | Tsubota ...................... 348/526 |
| 5,585,864 A | * | 12/1996 | Takeuchi ..................... 348/561 |
| 5,663,765 A | | 9/1997 | Matsuse et al. |
| 5,675,390 A | * | 10/1997 | Schindler et al. ........... 348/552 |
| 5,936,676 A | * | 8/1999 | Ledinh ....................... 348/451 |
| 5,978,545 A | * | 11/1999 | Kato .......................... 386/112 |
| 6,002,442 A | * | 12/1999 | Li ............................... 348/910 |
| 6,005,630 A | * | 12/1999 | Bril ............................ 348/447 |
| 6,011,583 A | * | 1/2000 | Hieda ........................ 348/220 |
| 6,040,869 A | * | 3/2000 | Dischert ..................... 348/448 |
| 6,046,721 A | * | 4/2000 | Song et al. ................. 345/603 |
| 6,055,018 A | * | 4/2000 | Swan ......................... 348/447 |
| 6,069,607 A | * | 5/2000 | Everett ....................... 345/133 |
| 6,072,530 A | * | 6/2000 | Bril ............................ 348/447 |
| 6,088,045 A | * | 7/2000 | Lumelsky ................... 345/509 |
| 6,326,935 B1 | * | 12/2001 | Boger ......................... 345/3.2 |

FOREIGN PATENT DOCUMENTS

| | | | | | |
|---|---|---|---|---|---|
| JP | 354023332 A | * | 2/1979 | ......... | G06K/15/20 |
| JP | 406245158 A | * | 9/1994 | ......... | H04N/5/445 |
| JP | 7-75055 | | 3/1995 | | |
| JP | 8-116502 | | 5/1996 | | |
| JP | 410003284 A | * | 1/1998 | ............ | G09G/3/36 |

* cited by examiner

*Primary Examiner*—Matthew C. Bella
*Assistant Examiner*—Wesner Sajous
(74) *Attorney, Agent, or Firm*—Finnegan, Henderson, Farabow, Garrett & Dunner, L.L.P.

(57) ABSTRACT

When video data is odd field data, interlaced data for an even field consisting of all black even line data is appended to that video data by an interlaced data appending circuit. On the other hand, when video data is even field data, interlaced data for an odd field consisting of all black odd line data is appended to that video data by the interlaced data appending circuit. Noninterlaced data generated in this way is noninterlaced-displayed on a display monitor such as an LCD, CRT, or the like.

26 Claims, 12 Drawing Sheets

DISPLAY CONTROL APPARATUS

BACKGROUND OF THE INVENTION

This application is based on Japanese Patent Application No. 10-178790, filed Jun. 25, 1998, the contents of which are incorporated herein by reference.

The present invention relates to a display control apparatus and interlaced data display control method and, more particularly, to a display control apparatus for displaying interlaced display image data such as a moving image on a display device used as a display monitor for a computer, and an interlaced data display control method.

In recent years, upon developments of computers and multimedia techniques, a variety of so-called multimedia computer systems have been developed. A computer system of this type has a function of playing back moving image and audio data in addition to text and graphics data.

With the advent of such multimedia computers, recently, a DVD is receiving a lot of attention as a new medium that takes the place of a CD-ROM. A DVD-ROM medium can record data around 4.7 Gbytes on one side, which is about seven times the capacity of the existing CD-ROM, and around 9.4 Gbytes on two sides. Using this DVD-ROM medium, a title such as a movie which contains a large volume of video information can be played back with high image quality.

The contents of a DVD are decoded by a DVD decoder, and are output as 60-Hz field data for interlaced display, which corresponds to an NTSC output.

When such data are displayed on a display monitor of a computer, the interlaced display data output from the DVD decoder must be converted into noninterlaced display data. The interlace to noninterlace conversion is done by a display controller that controls the display monitor.

The interlace to noninterlace conversion by the display controller is normally done using simple field combination. That is, one frame is generated by superposing even and odd fields on a frame memory, and is noninterlaced-displayed on the display monitor of the computer.

However, when the interlace to noninterlace conversion using such simple field combination is made, fields having a time difference are combined into a single frame, and so-called feathering occurs, i.e., an edge forms a stripe pattern. This phenomenon is especially conspicuous in a scene with fast motions.

BRIEF SUMMARY OF THE INVENTION

It is an object of the present invention to provide a display control apparatus and interlaced data display control method, which can display a smooth image free from feathering on a display monitor of a computer, and can display interlaced data such as a moving image, which is created for a TV, with high quality.

In order to achieve the above object, according to the present invention, an apparatus comprises: input means for inputting interlaced data; and noninterlaced data generation means for generating noninterlaced data by appending interlaced data of a predetermined color to the interlaced data input by the input means.

In this display control apparatus, interlaced data of a predetermined color is appended as dummy data to the input interlaced data to generate pseudo noninterlaced data. The pseudo noninterlaced data is noninterlaced-displayed on the display device. In this way, since the input interlaced data mimics noninterlaced data upon appending dummy data, feathering resulting from combination of fields with a time difference can be prevented. Hence, interlaced data such as a moving image can be smoothly displayed on a noninterlaced scan display device such as a CRT, LCD, or the like.

As the interlaced data of the predetermined color, relatively dark color data (e.g., black) or equivalent is preferably used, since it hardly influences an image of the input interlaced data. Especially, since black data becomes the color of the screen in a non-display (blanking) period, the influence on the image of the input interlaced data can be minimized using black data as dummy data.

Also, according to the present invention, an apparatus for displaying display data written in a video memory on a display device capable of noninterlaced/interlaced display, comprises a port for receiving interlaced display video data from an external source, means for switching a display mode for controlling the display device from a noninterlaced display mode to an interlaced display mode when the interlaced display video data input from the port is displayed, and means for outputting the interlaced display video data received from the port to the display device.

In this apparatus, interlaced data such as a moving image can be displayed on the display device such as a CRT with high quality without deteriorating the video quality due to interlace to noninterlace conversion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described hereinafter with reference to the accompanying drawings.

Figure 1:
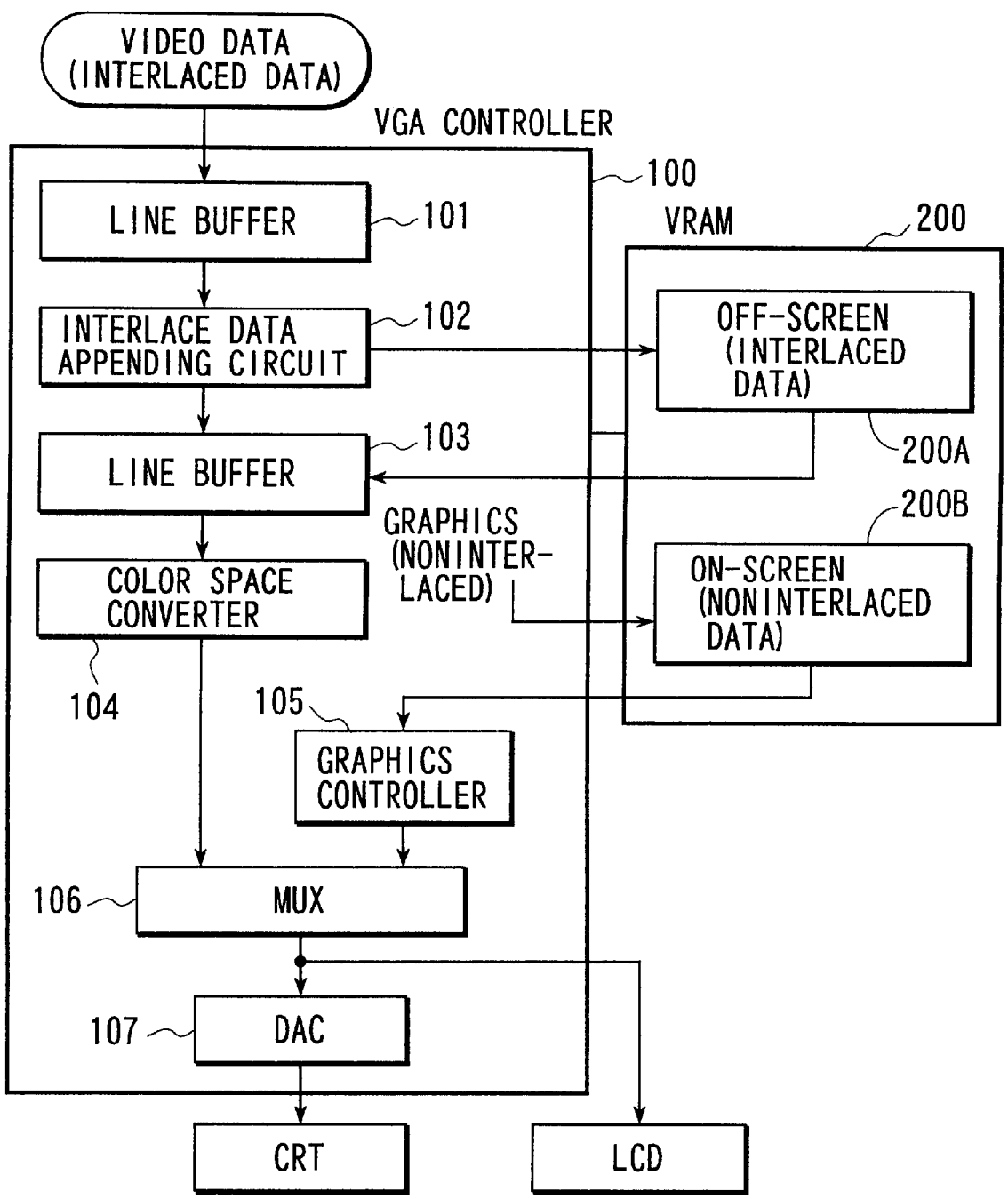
FIG. 1 is a block diagram showing the basic arrangement of a display control apparatus according to the present invention.

FIG. 1 shows a VGA controller 100 according to the present invention. The VGA controller 100 controls the display monitor of a personal computer, and supports display of text, graphics, and moving image data. The VGA controller 100 is implemented by a 1-chip LSI, and has a video port such as a ZV port or APG port for directly receiving moving image data (video data) from a DVD decoder, satellite tuner, or the like via a dedicated video bus, in addition to a normal system bus interface for exchanging data with the CPU of the personal computer. Video data input to this video port is normally interlaced data for TV display. An arrangement and method for displaying this video data on a noninterlaced scan display device such as a CRT, LCD, or the like used as a display monitor of a personal computer will be explained below.

Video data input from the video port is digital YUV data, which is sent to an interlaced data appending circuit 102 via a line buffer 101. The interlaced data appending circuit 102 generates pseudo noninterlaced data by appending interlaced data of a predetermined color as dummy data to the video data formed by interlaced data. In this case, dummy line data of a specific color is appended to one of odd and even line data as the other one of odd and even line data.

As the dummy data to be appended to the video data, YUV data of a relatively dark color (e.g., black or equivalent), which hardly influences the display image of the video data, is preferably used. A case will be exemplified below wherein black data is used as the dummy data.

Noninterlaced data output from the interlaced data appending circuit 102 is sent to a line buffer 103 after it is written in an off-screen area 200A of an image memory (VRAM) 200, or directly by bypassing the image memory (VRAM) 200. The line buffer 103 is a buffer for timing adjustment, and is not always required. As described above, data output from the interlaced data appending circuit may be stored in the off-screen area 200A or may be held in the line buffer 103 depending on the system specifications. Also, both the off-screen area 200A and line buffer 103 may be used. For example, half frame data (e.g., an odd field) may be stored in the off-screen area 200A, and the remaining half frame data (even field) may be held in the line buffer 103 to synchronize the odd and even fields. When the output from the interlaced data appending circuit 102 is directly output to the line buffer 103 without being stored in the off-screen area 200A, a video capture function or screen print function cannot be provided. However, when the output is stored in the off-screen area 200A, such functions can be activated. If the line buffer 103 is not present, noninterlaced data is directly transferred from the off-screen area 200A or interlaced data appending circuit 102 to a color space converter 104.

The color space converter 104 converts the color space of the video data from the YUV format into the RGB format which is the same as that of graphics data. That is, the converter 104 converts the color space of noninterlaced data generated by the interlaced data appending circuit 102 into the RGB format, and sends the converted data to the first input of a 2-input multiplexer (MUX) 106. The second input of the multiplexer (MUX) 106 receives graphics data written on an on-screen area 200B of the VRAM 200 by a CPU via a graphics controller 105. The graphics controller 105 includes a color pallet for converting the number of colors of graphics data, a circuit for generating display timing control signals (horizontal sync signal HSYNC, vertical sync signal VSYNC, and the like) for a CRT and LCD, and the like.

The multiplexer (MUX) 106 selects one of noninterlaced video data generated by the interlaced data appending circuit 102, and graphics data, or combines the noninterlaced video data on the graphics data. This combination is implemented by known methods such as 1) a color key, 2) α blending, 3) coordinate comparison, and the like.

The combined data output from the multiplexer (MUX) 106 is output as RGB display data to the LCD, and is noninterlaced-displayed on the LCD. At the same time, the combined data is converted into an analog RGB signal by a DAC 107, and the analog RGB signal is sent to the CRT display to be noninterlaced-displayed thereon.

The operation principle of the interlaced data appending circuit 102 will be explained below with reference to FIGS. 2 and 3.

Figure 2:
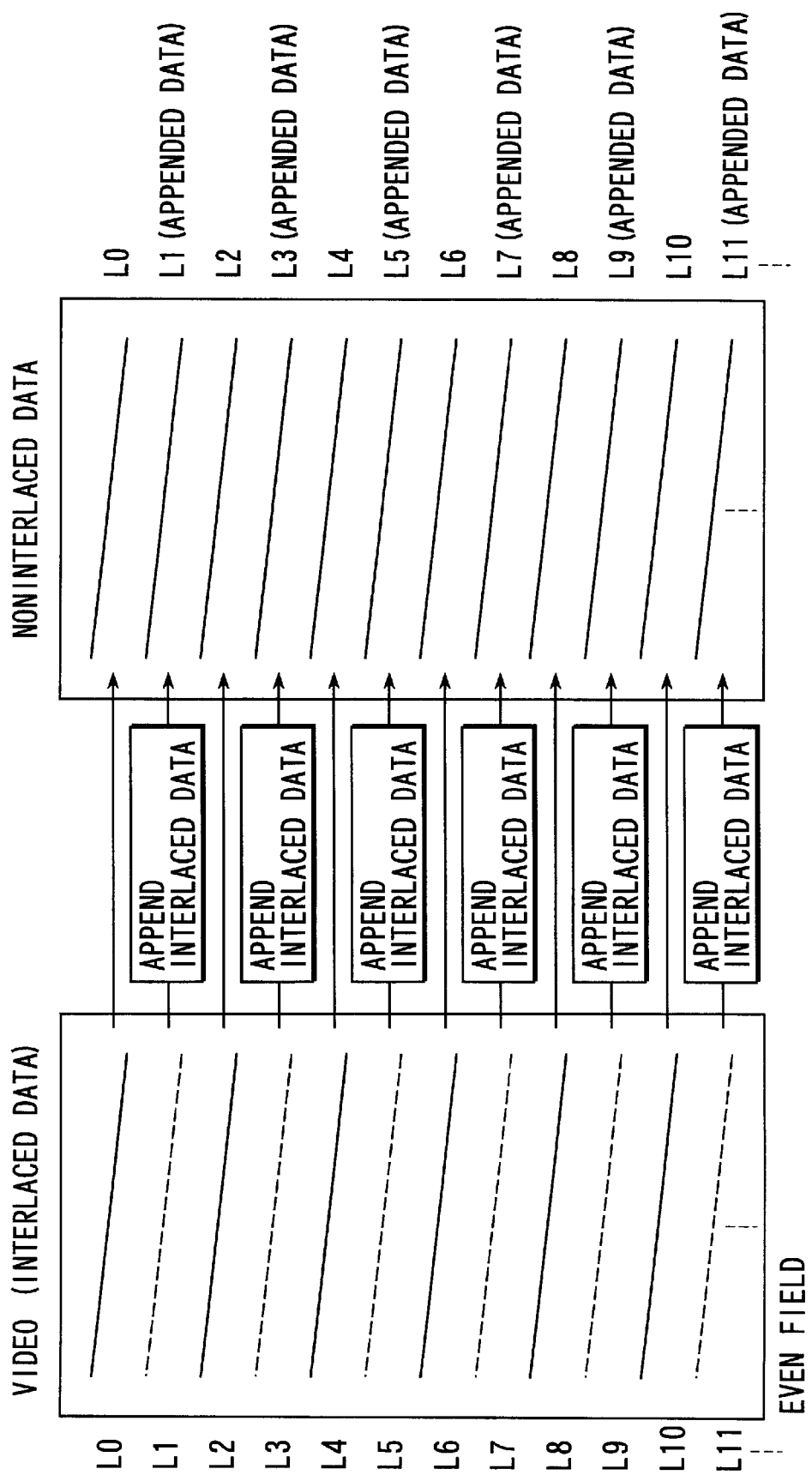
FIG. 2 is a view for explaining the operation principle of an interlaced data appending circuit included in the display control apparatus of the present invention.
Figure 3:
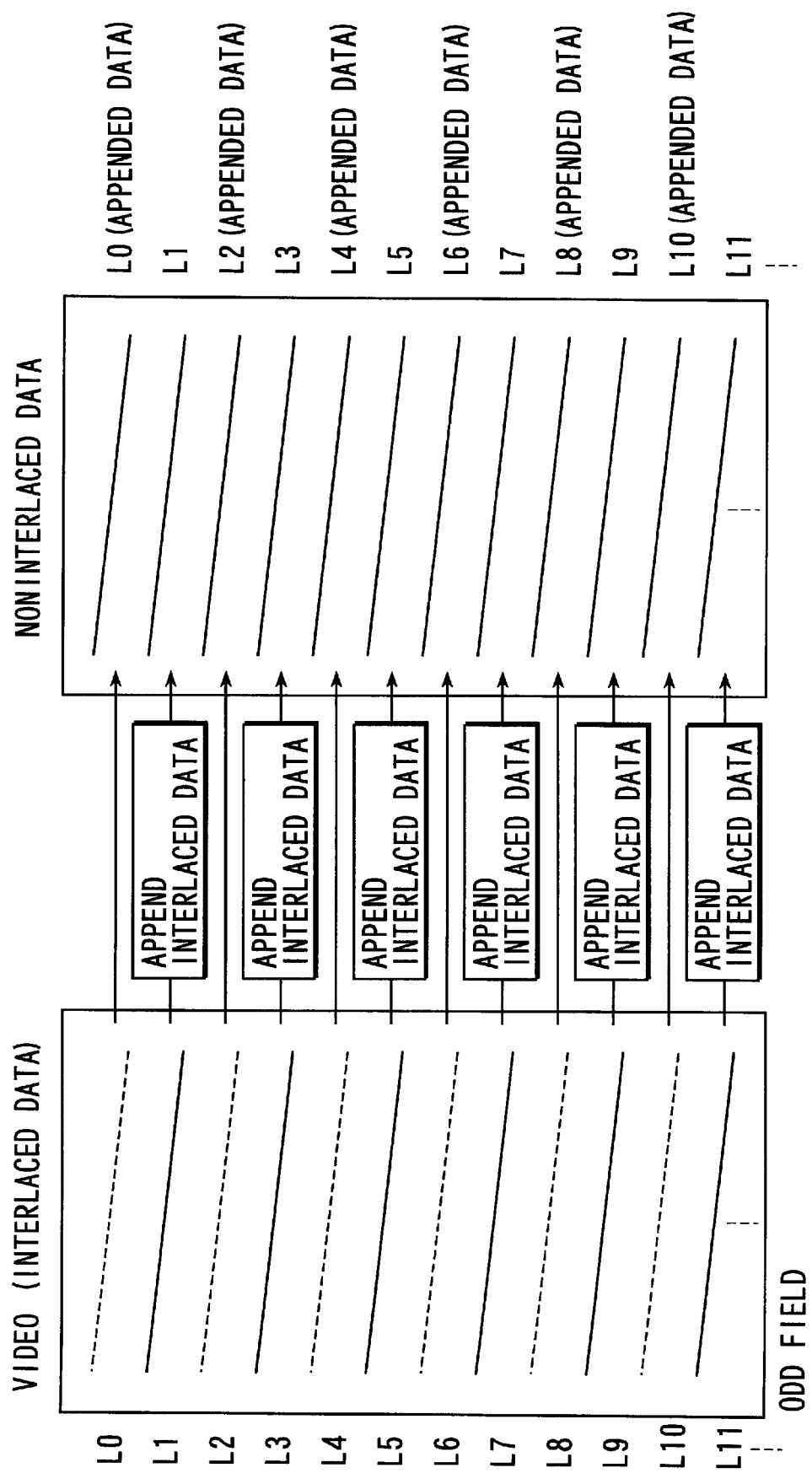
FIG. 3 is a view for explaining the operation principle of an interlaced data appending circuit included in the display control apparatus of the present invention.

As shown in FIG. 2, when video data input from the video port is even field (EVEN) data, interlaced data of that even field is made up of even line data (L0, L2, L4, L6, . . . ) alone. In this case, the interlaced data appending circuit 102 appends interlaced data of an odd field consisting of all black odd line (L1, L3, L5, L7, . . . ) data alone.

More specifically, the interlaced data appending circuit 102 alternately outputs input video data and black data (appended data) in units of lines in the order of even line data L0 of the video data, odd line data L1 made up of black data, even line data L2 of the video data, odd line data L3 made up of black data, even line data L4 of the video data, . . . . With this control, the video data in the even field is converted into noninterlaced data having all black data as odd line data.

On the other hand, when video data input from the video port is odd field (ODD) data, interlaced data of that odd field is made up of odd line data (L1, L3, L5, L7, . . . ) alone. In this case, the interlaced data appending circuit 102 appends interlaced data of an even field consisting of all black even line (L0, L2, L4, L6, . . . ) data alone.

More specifically, the interlaced data appending circuit 102 alternately outputs input video data and black data (appended data) in units of lines in the order of even line data L0 made up of black data, odd line data L1 of the video data, even line data L2 made up of black data, odd line data L3 of the video data, even line data L4 made up of black data . . . . With this control, the video data in the odd field is converted into noninterlaced data having all black data as even line data.

Figure 4:
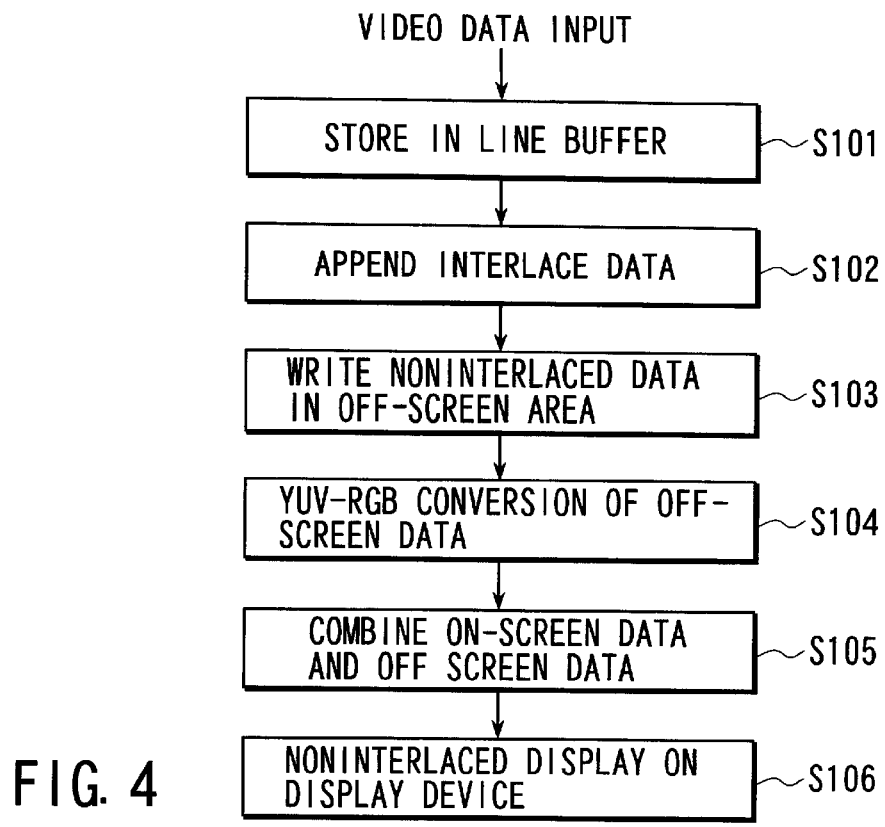
FIG. 4 is a flow chart showing the flow of video data display control using an off-screen area of an image memory shown in FIG. 1.
Figure 5:
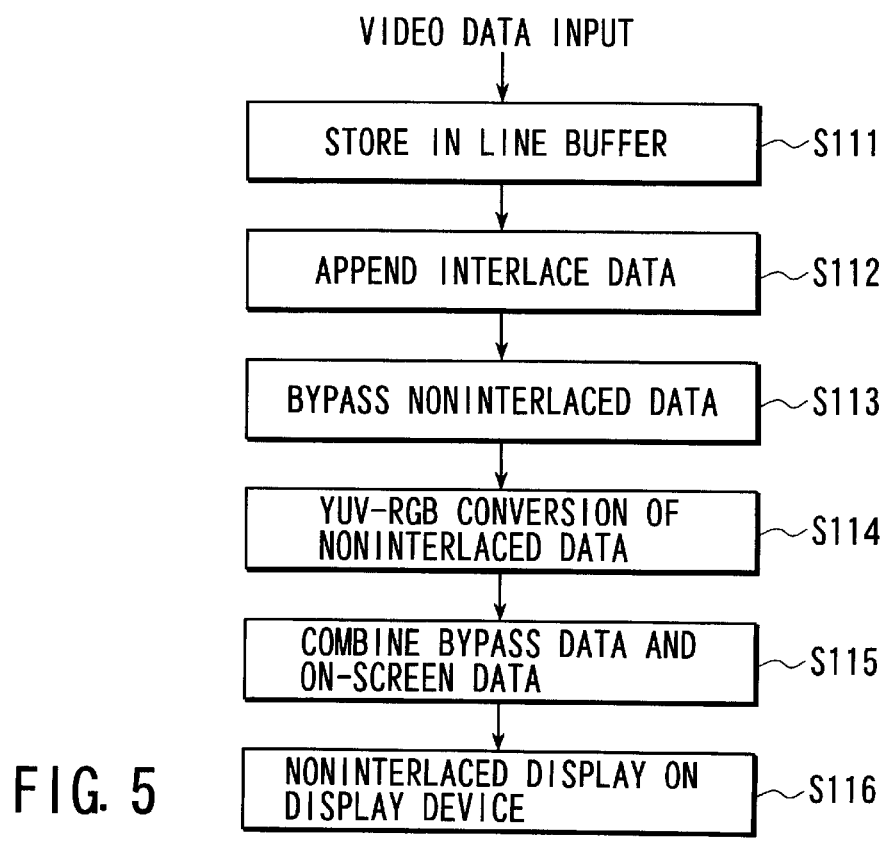
FIG. 5 is a flow chart showing the flow of video data display control when the image memory is bypassed.

The flow of video data display control will be explained below with reference to FIGS. 4 and 5. FIG. 4 shows the processing sequence when the off-screen area 200A is used, and FIG. 5 shows the processing sequence when the VRAM 200 is bypassed.

(When Off-screen Area 200A is Used)

As shown in FIG. 4, video data input from the video port is stored in the line buffer 101 (step S101). The interlaced data appending circuit 102 appends black line data to each line of the video data to generate noninterlaced data (step S102). This noninterlaced data is written in the off-screen area 200A of the VRAM 200 (step S103). In this case, the line data in the line buffer 101 and black line data are alternately output from the interlaced data appending circuit 102, and are written in turn in the off-screen area 200A of the VRAM 200.

The noninterlaced data (off-screen data) in the off-screen area 200A is then converted by the color space converter 104 from YUV data into RGB data (step S104). The off-screen data converted into the RGB data and graphics data (on-screen data) in the on-screen area 200B are combined by the multiplexer 106 (step S105), and the combined data is noninterlaced-displayed on one or both of the LCD and CRT (step S106).

(When VRAM 200 is Bypassed)

As shown in FIG. 5, video data input from the video port is stored in the line buffer 101 (step S111). The interlaced data appending circuit 102 appends black line data to each line of the video data to generate noninterlaced data (step S112). This noninterlaced data bypasses the VRAM 200, and is directly sent to the color space converter 104 (step S113). In this case, the line data in the line buffer 101 and black line data are alternately output from the interlaced data appending circuit 102, and are sequentially sent to the color space converter 104.

The bypass data is then converted by the color space converter 104 from YUV data into RGB data (step S114). The bypass data converted into the RGB data and graphics data (on-screen data) in the on-screen area 200B are combined by the multiplexer 106 (step S115), and the combined data is noninterlaced-displayed on one or both of the LCD and CRT (step S116).

Figure 6:
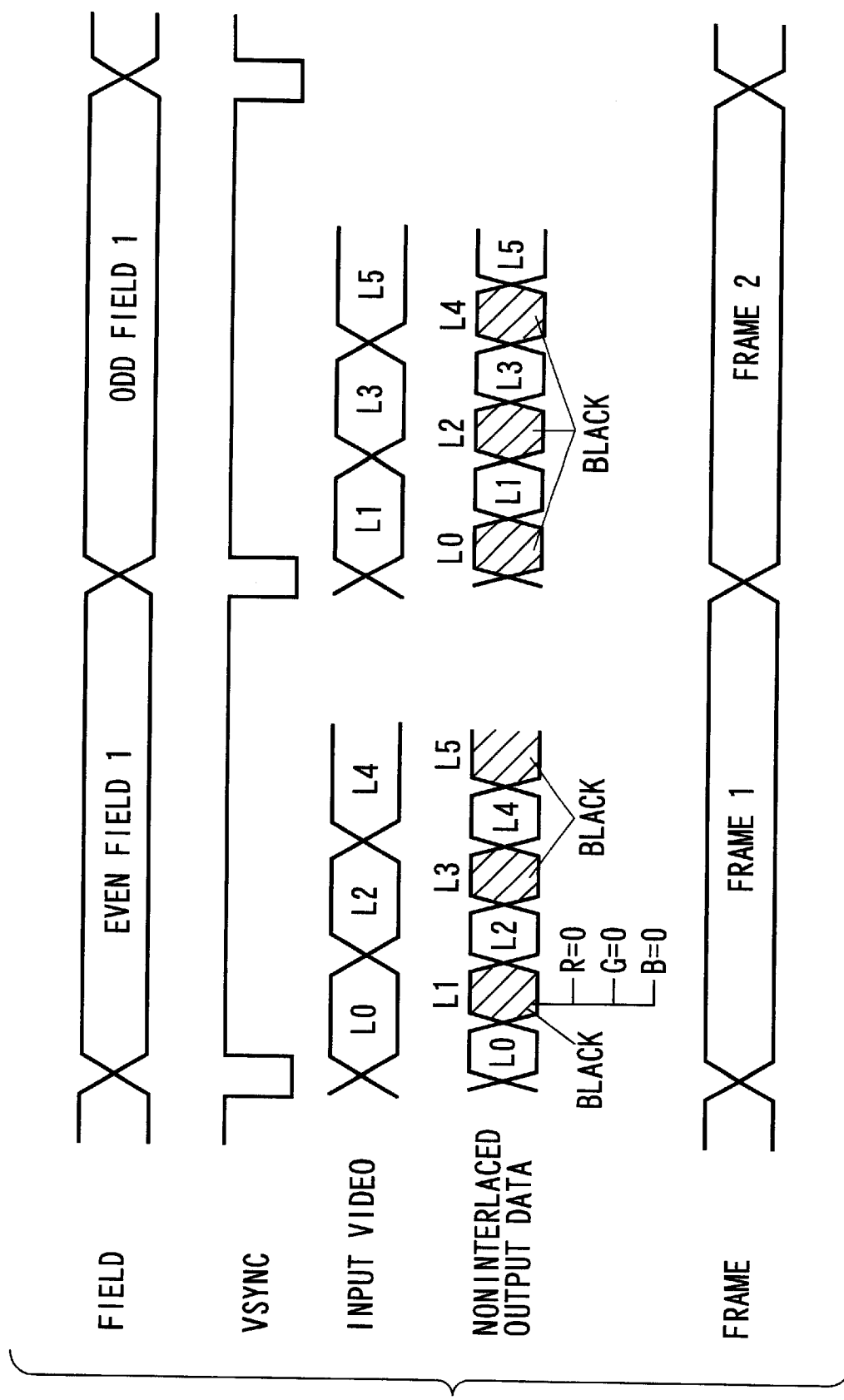
FIG. 6 is a timing chart showing the operation upon noninterlaced-displaying video data.

FIG. 6 shows an example of the timing chart upon noninterlaced-displaying video data.

As described above, video data input from the video port is interlaced data having a field structure in which even and odd fields alternately appear, and its field frequency is, e.g., 60 fields/sec. A vertical sync signal (VSYNC) contained in the video data indicates a field boundary upon interlaced-scanning the video data.

In an even field (Even field 1) of the video data, black data is inserted as odd line data L1 between even line data L0 and L2 of the video data, and black data is inserted as odd line data L3 between even line data L2 and L4, as shown in FIG. 6.

The video data in the even field (Even field 1), the odd field data of which are interpolated by black data in this way, is output as noninterlaced data (Frame 1) having a frame structure to the LCD and/or CRT. Black data to be output to the LCD and/or CRT is blanking data of R=0, G=0, and B=0.

Hence, on the display screen of Frame 1, even lines display an image of the input video data, and odd lines are set in the blanking state, i.e., a non-display screen color by black data.

On the other hand, in an odd field (odd field 1) of the input video data, even field data are interpolated by black data. With this interpolation, the video data in the odd field (odd field 1) is output as noninterlaced data (Frame 2) having a frame structure to the LCD and/or CRT. Hence, on the display screen of Frame 2, odd lines display an image of the input video data and even lines are set in the blanking state by the black data, contrary to Frame 1.

In this fashion, by alternately exchanging odd and even display/blanking lines in units of frames of noninterlaced data, screen refresh can be realized by interlaced scanning on the noninterlaced display monitor.

Hence, upon playing back a DVD video, feathering as a result of superposing fields having a time difference on the same frame can be prevented, and high image quality equivalent to that of a combination of a dedicated DVD video player and TV receiver can be realized on the display monitor of the personal computer.

Note that color data used as dummy data can be arbitrarily selected as long as they do not influence an image of the input video data to be displayed, and may be relatively dark colors other than black such as gray.

Figure 7:
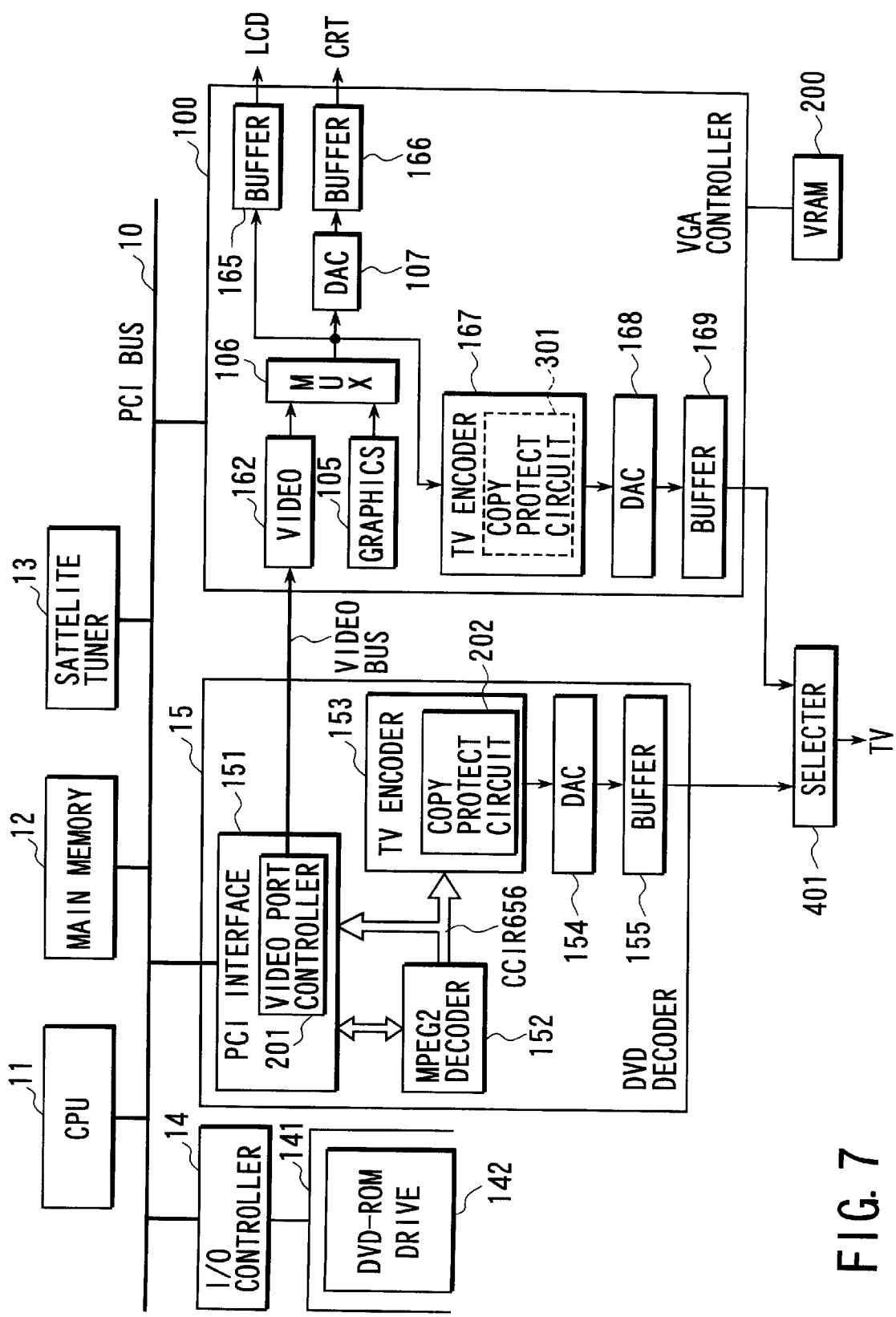
FIG. 7 is a block diagram showing the system arrangement of a personal computer which uses the display control apparatus of the present invention.

FIG. 7 shows an example of the overall arrangement of a personal computer which uses the VGA controller 200 shown in FIG. 1.

This personal computer is a notebook computer having a flat panel display such as an LCD, which is attached to a computer main body to be free to open/close. As shown in FIG. 7, the personal computer comprises a PCI bus 10, CPU 11, main memory 12, satellite tuner 13, I/O controller 14, DVD decoder 15, and the aforementioned VGA controller 100 and image memory (VRAM) 200.

The CPU 11 controls the operation of the entire system, and executes an operating system, an application program to be executed, and the like, stored in the main memory 12. Data recorded on a DVD-ROM medium are transferred and played back by making the CPU 11 execute various driver programs for hardware control and a DVD application program.

The satellite tuner 13 receives video data transmitted from a digital satellite broadcast, and transfers it to the main memory 12. When video data sent by a digital satellite broadcast is made up of MPEG2 streams, the data is decoded by an MPEG2 decoder in the DVD decoder 15 in the same manner as video data read out from a DVD-ROM drive 142.

The I/O controller 14 is connected to a device bay 141 for selectively mounting the DVD-ROM drive 142 on the computer main body, and transfers data with the DVD-ROM drive 142 mounted on the device bay 141.

The DVD-ROM drive 142 reads out data streams stored in a DVD medium having a storage capacity around 10 GB on its two surfaces at a transfer rate of 10.8 Mbps (maximum). The DVD medium can record a DVD title such as a movie and the like. The movie information can contain main picture (video) data, sub-picture data for 16 channels (maximum), and audio data for 32 channels (maximum). In this case, these video, sub-picture, and audio data are recorded after they are digitally compression-encoded by MPEG2. In MPEG2, data encoded by MPEG2 can contain other encoded data, and such encoded data are processed as a single MPEG2 program stream.

Video data is encoded by MPEG2, and sub-picture and audio data are encoded by runlength coding and DOLBY DIGITAL. Again, these encoded video, sub-picture, and audio data are processed as a single MPEG2 program stream.

Encoding by MPEG2 is variable-rate encoding, and the size of information to be recorded/played back per unit time can be varied. Hence, as a scene includes faster motions, a higher transfer rate of an MPEG stream that forms corresponding frames is set, thus attaining motion image playback with higher quality.

The DVD decoder 15 receives an MPEG2 stream read out from the DVD-ROM 142 or received by the satellite tuner 13 via the PCI bus 10, and decodes the received stream to descramble or expand it. The DVD decoder 15 is constructed by a PCI interface 151, MPEG2 decoder 152, TV encoder 153, D/A converter (DAC) 154, and TV video signal output buffer 155, as shown in FIG. 7.

The PCI/MPEG interface 151 interfaces between the PCI bus 10 and MPEG2 decoder 152, and sends an MPEG2 stream received via the PCI bus 10 to the MPEG2 decoder 152. The PCI/MPEG interface 151 has a video port controller 201. The video port controller 201 transfers digital YUV video data (interlaced data) decoded by the MPEG2 decoder 152 to the video input port of the VGA controller 100 via a video bus comprising, e.g., a ZV port or the like.

The MPEG2 decoder 152 decodes an MPEG2 stream received from the PCI/MPEG interface 151, and includes a descramble processor, MPEG2 stream multiplexer/demultiplexer, and decoders corresponding to video, audio, and sub-picture data, and the like. Digital YUV data as a decoding result of video and sub-picture data by the MPEG2 decoder is supplied to the video port controller 201 of the PCI/MPEG interface 151 and TV encoder 153 as a digital signal in the CCIR656 format.

The TV encoder 153 converts the digital YUV data supplied from the MPEG2 decoder 152 into a TV video signal in the NTSC/PAL format, and outputs a Y/C composite video signal (Composite) and a Y/C-separated S-video signal as a TV video signal. The TV encoder 153 includes a copy protect circuit 202. The copy protect circuit 202 protects a TV video signal from being recorded by a recording equipment such as a VTR or the like, and performs predetermined processing for copy protection with respect to a burst signal of the TV video signal. When the TV video signal is copy-protected in such way, the TV video signal is normally displayed on a TV, but can be protected from being recorded by a recording equipment such as a VTR. The copy-protected TV video signal is converted into an analog signal by the DAC 154, and the analog signal is sent to a selector 401 via the buffer 155.

As described above, the VGA controller 100 controls an LCD display provided as a dedicated display to the computer main body, and an external CRT display, and supports moving image display in addition to VGA text and graphics displays. The VGA controller 100 comprises a video display controller 162, multiplexer 163, D/A converter (DAC) 164, analog RGB signal output buffers 165 and 166, TV encoder 167, D/A converter (DAC) 167, D/A converter (DAC) 168, TV analog video signal output buffer 169, and the like in addition to the aforementioned graphics controller (Graphics) 105, multiplexer 106, and DAC 107.

The video display controller 162 serves as an interface with the above-mentioned digital video input port, and incorporates the line buffers 101 and 103, interlaced data appending circuit 102, and color space converter 104 described with reference to FIG. 1.

Display data output from the multiplexer 106 is sent as digital data to the LCD via the buffer 165. Also, the display data is converted into an analog RGB signal by the D/A converter 164, and the analog RGB signal is sent to the external CRT display via the buffer 166.

The TV encoder 167 converts the display data output from the multiplexer 106 into a TV video signal (S, Composite) for NTSC/PAL. The TV video signal obtained by the TV encoder 167 is converted into an analog TV video signal by the D/A converter 168, and the analog TV video signal is sent to the above-mentioned selector 401 via the buffer 169.

The TV encoder 167 preferably comprises a copy protect circuit 301, which is the same as the copy protect circuit 202 in the DVD decoder 15.

The selector 401 receives the TV video signal (S, Composite) of the DVD video obtained by the DVD decoder 15, and the TV video signal (S, Composite) of the personal computer screen obtained by the VGA controller 100, and selectively outputs these two different input S-video signals and two different input Composite video signals to an external TV via the S and Composite terminals provided to the computer main body.

The second example of the arrangement of the VGA controller 100 will be explained below with the aid of FIG. 8.

Figure 8:
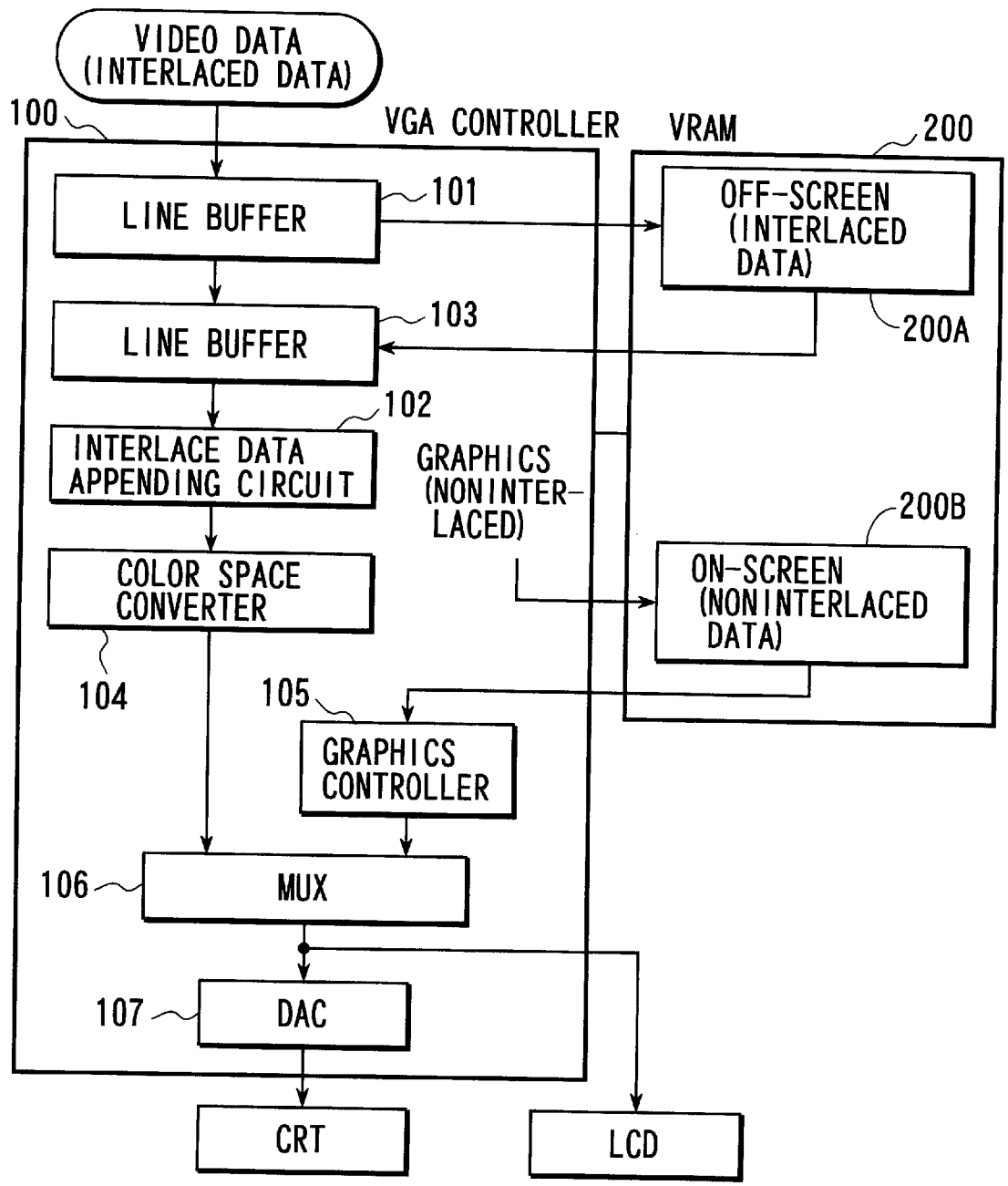
FIG. 8 is a block diagram showing the second example of the arrangement of the display control apparatus of the present invention.

Referring to FIG. 8, the interlaced data appending circuit 102 is inserted after the line buffer 103, and appends black data to interlaced video data read out from the off-screen area 200A. Compared to the embodiment shown in FIG. 1, since interlaced data before being appended with black data is stored in the off-screen area 200A in the embodiment shown in FIG. 8, the memory capacity of the off-screen area 200A can be half that of the embodiment shown in FIG. 1. The flow of video data display control is as shown in FIG. 9.

Figure 9:
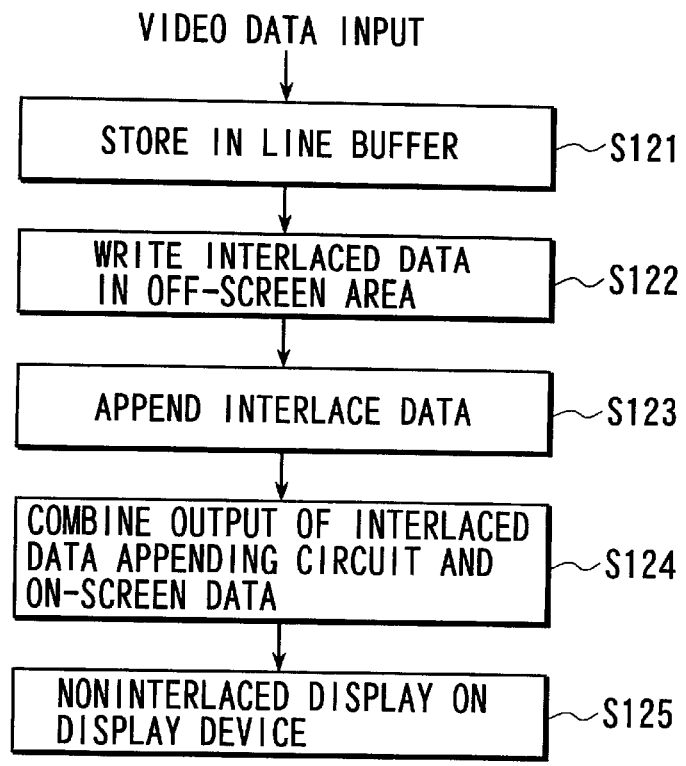
FIG. 9 is a flow chart showing the flow of video data display control in the display control apparatus shown in FIG. 8.

More specifically, as shown in FIG. 9, video data input from the video port is stored in the line buffer 101 (step S121), and is written as interlaced data in the off-screen area 200A of the VRAM 200 via this line buffer 101 (step S122). The interlaced data in the off-screen data is sent to the interlaced data appending circuit 102 via the line buffer 103, and black line data are appended by the circuit 102 in units of lines of the video data, thus generating noninterlaced data (step S123).

This noninterlaced data is subjected to color space conversion (YUV to RGB), and is then combined with graphics data (on-screen data) in the on-screen area 200B by the multiplexer 106 (step S124). The combined data is noninterlaced-displayed on one or both of the LCD and CRT (step S125).

An example of the arrangement of the interlaced data appending circuit 102 will be described below with reference to FIG. 10.

Figure 10:
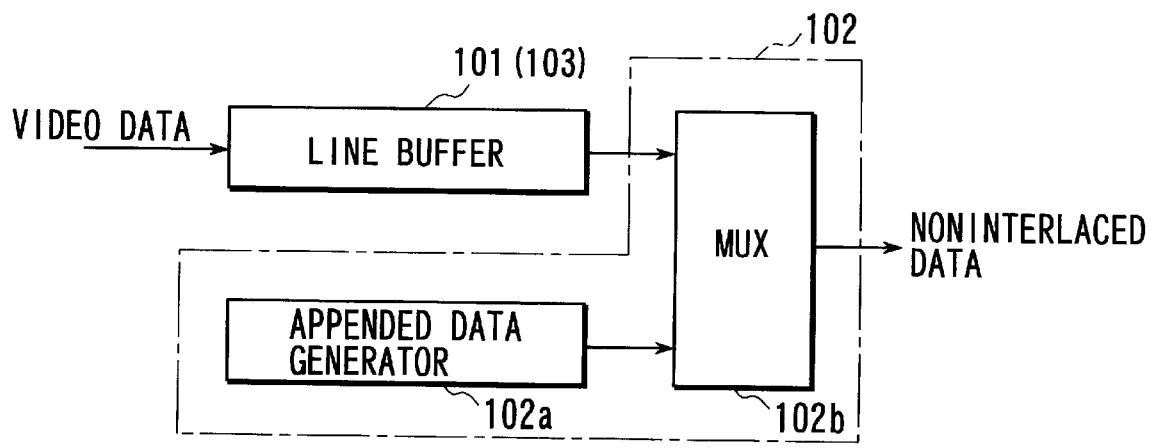
FIG. 10 is a diagram showing an example of the arrangement of the interlaced data appending circuit included in the display control apparatus of the present invention.

As shown in FIG. 10, the interlaced data appending circuit 102 comprises an appended data generator 102a and multiplexer 102b. The appended data generator 102a generates black or equivalent line data as dummy data. The multiplexer 102b alternately selects, in units of lines, video data input to the line buffer 101 (or 103) in units of lines, and line data output from the appended data generator 102a, so that dummy data is appended to each one of odd and even line data contained in video data as the other of odd and even line data.

To restate, according to the embodiment, interlaced data of a predetermined color is appended as dummy data to interlaced video data to generate pseudo noninterlaced data. The pseudo noninterlaced data is noninterlaced-displayed on a computer display monitor such as an LCD, CRT, or the like. Since the input video data mimics noninterlaced data upon appending dummy data, feathering as a result of combination of fields having a time difference can be prevented, and interlaced data such as a moving image or the like can be smoothly displayed on a noninterlaced scan display device such as a CRT, LCD, or the like.

Especially, when black data is used as dummy data, blanking data is output to the display device for each one of odd and even line data contained in interlaced data as the other of odd and even line data, and screen refresh by interlaced scanning is realized on the noninterlaced display monitor. Hence, a high-quality image free from any influence of dummy data can be obtained.

Figure 11:
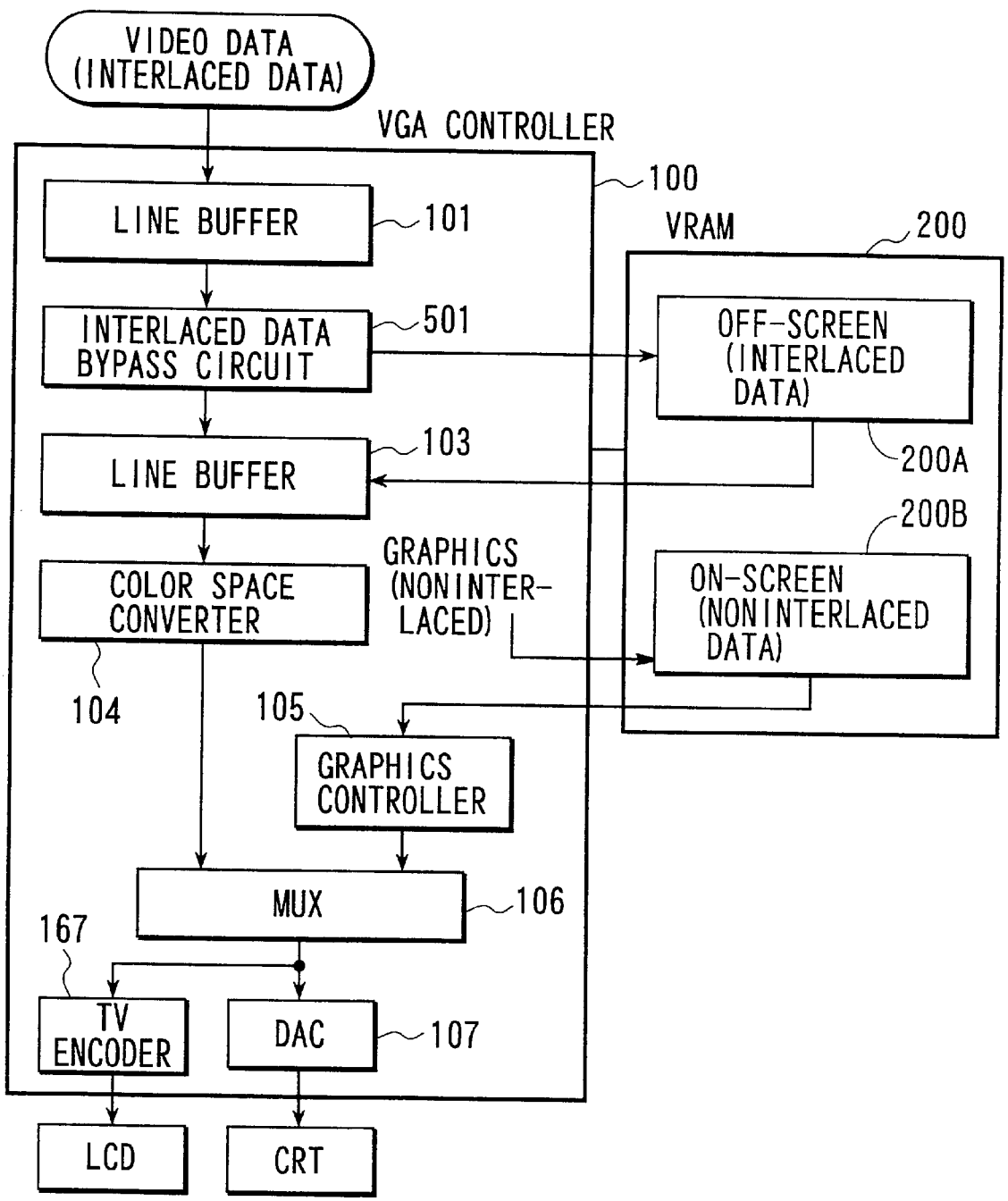
FIG. 11 is a block diagram showing the basic arrangement of a display control apparatus according to another embodiment of the present invention.

FIG. 11 shows a VGA controller 100 according to another embodiment of the present invention. The embodiment shown in FIG. 11 is premised on the use of a multisync compatible CRT display as a display monitor.

The multisync compatible CRT display can vary the display resolution in correspondence with the display timing signals such as horizontal and vertical sync signals, and the like supplied thereto, and can interlaced-display by a specific combination of these display timing signals. For example, video modes 28, 38, and 45 are interlaced display modes for a CRT, and when the VGA controller 100 is set in video mode 28, 38, or 45, the CRT is controlled in the interlaced display mode. In such case, the CRT receives, e.g., a vertical sync signal of 87 Hz, and a horizontal sync signal of 35.5 kHz.

In this embodiment, when interlaced video data is displayed on the CRT, the CRT is automatically switched from the noninterlaced display mode to the interlaced display mode to directly output the video data as interlaced data to the CRT and to interlaced-display the video data.

In order to implement a pass through mode for outputting video data to the CRT as interlaced data, the VGA controller 100 comprises an interlaced data bypass circuit 501 in place of the interlaced data appending circuit 102 shown in FIG. 1.

The interlaced data bypass circuit 501 writes video data input via a line buffer 101 in an off-screen area 200A of a VRAM 200 as interlaced data, or directly transfers the video data to an interface circuit for outputting display data (a color space converter 104, multiplexer 106, DAC 107, and the like) while bypassing the VRAM 200. In such case, a line buffer 103 is not always required as in the embodiment shown in FIG. 1.

The principle of video data (interlaced data) display control will be described below with reference to FIGS. 12A and 12B.

Figure 12A:
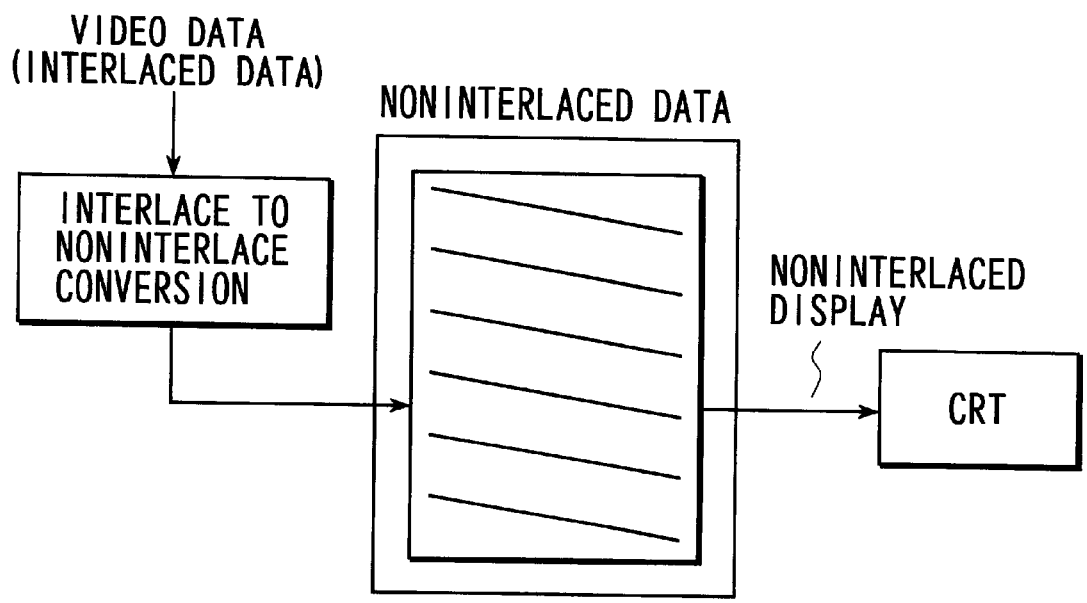
FIGS. 12A and 12B are views for explaining the principle of video data display control in the embodiment shown in FIG. 11.

FIG. 12A shows a normal display method of interlaced data. More specifically, interlaced data with a field structure is converted into noninterlaced data with a frame structure by combining its odd and even fields by field combination. The noninterlaced data is displayed on the CRT in the noninterlaced display mode.

Figure 12B:
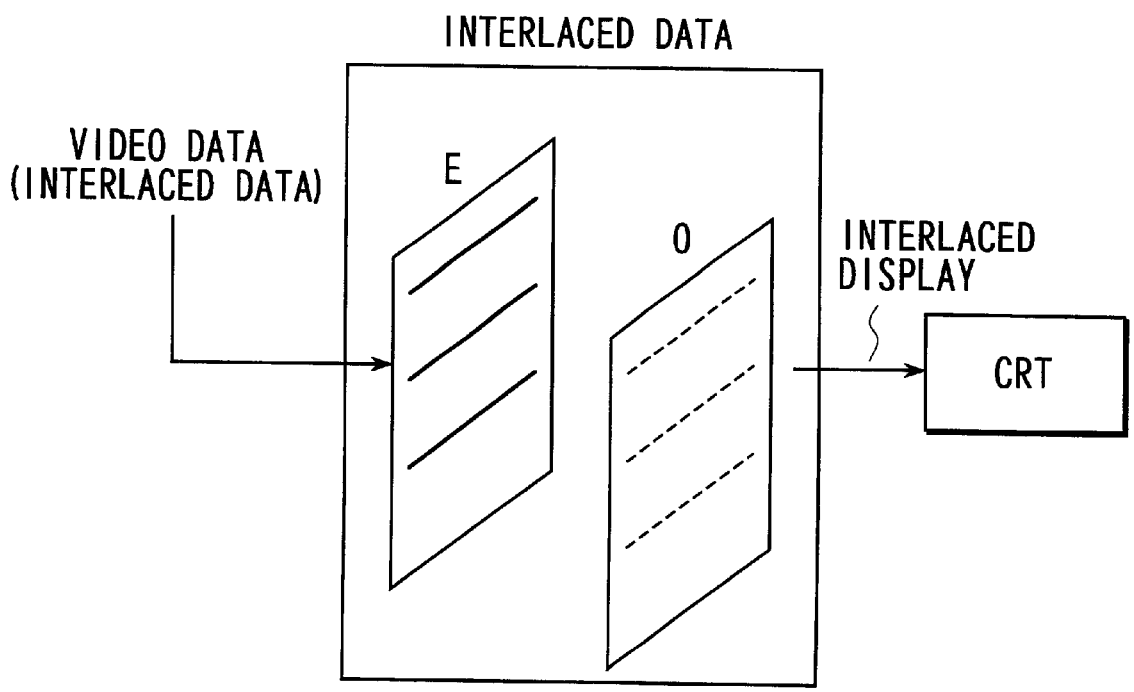

FIG. 12B shows a display method of interlaced data.

That is, interlaced data with a field structure is sent as display data to the CRT without being converted. Since the video mode for controlling the CRT is set in the interlaced display mode, the interlaced data is interlaced-displayed on the CRT.

In this manner, since interlaced data is interlaced-displayed on the CRT without being converted, interlaced data such as a moving picture can be displayed on the CRT with high quality without any feathering arising from interlace to noninterlace conversion. Since a TV also operates in the interlaced display mode, video data can be sent as interlaced data to a TV encoder 167. In this case, the TV encoder 167 need not perform interlace to noninterlace conversion, and display quality can be improved.

Figure 13:
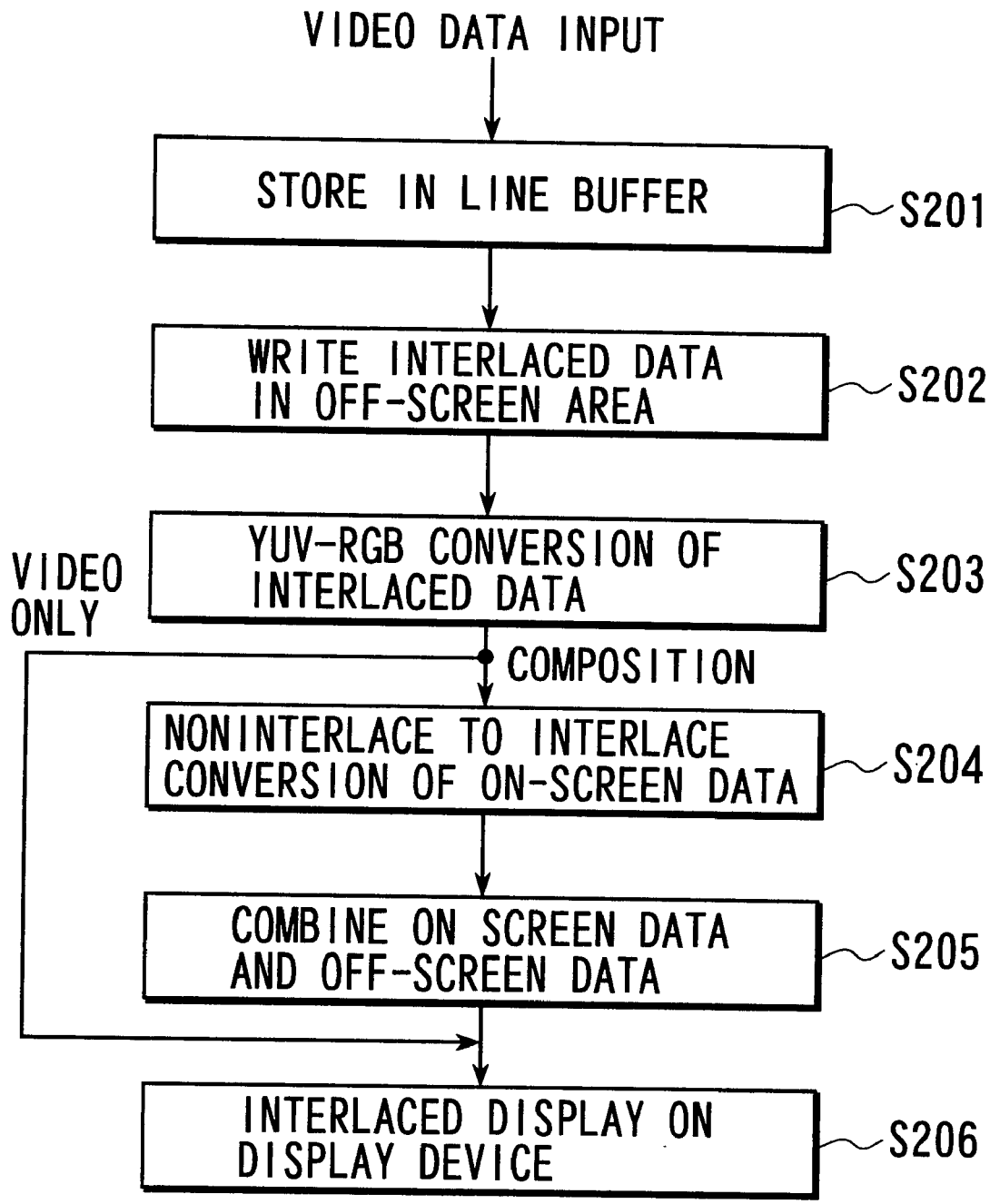
FIG. 13 is a flow chart showing the flow of video data display control using an off-screen area of an image memory in the embodiment shown in FIG. 11.
Figure 14:
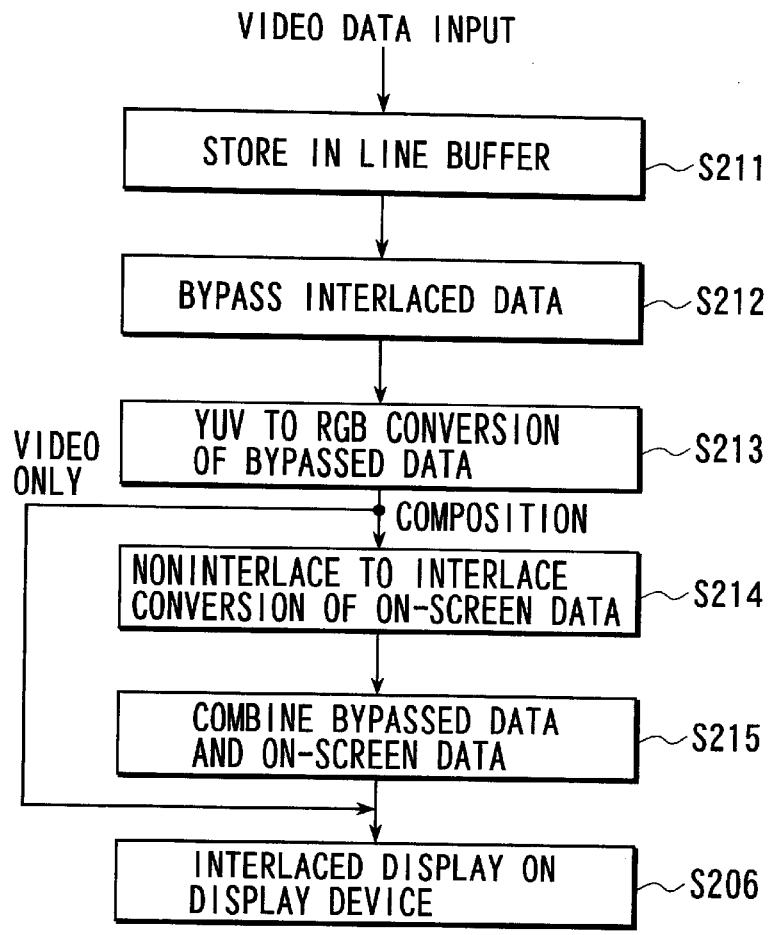
FIG. 14 is a flow chart showing the flow of video data display control when the image memory is bypassed in the embodiment shown in FIG. 11.

The flow of video data display control will be explained below with reference to FIGS. 13 and 14. FIG. 13 shows the processing sequence when the off-screen area 200A is used, and FIG. 14 shows the processing sequence when the VRAM 200 is bypassed.

(When Off-screen Area 200A is Used)

As shown in FIG. 13, video data input from the video port is stored in the line buffer 101 (step S201). Then, the video data is written in the off-screen area 200A of the VRAM 200 as interlaced data via the interlaced data bypass circuit 501 (step S202). After that, the color space converter 104 converts the interlaced data (off-screen data) in the off-screen area 200A from YUV data into RGB data (step S203). Also, a filter circuit in a graphics controller 105 converts graphics data (on-screen data) in an on-screen area 200B from noninterlaced data into interlaced data (step S204). The noninterlace to interlace conversion can be implemented by calculating average data in units of pixels for each pair of successive lines of noninterlaced data.

The off-screen data converted into RGB data and the on-screen data converted into interlaced data are then combined by the multiplexer 106 (step S205), and the combined data is interlaced-displayed on the CRT or TV (step S206).

Note that the processing in steps S204 and S205 can be omitted if video data alone is displayed.

(When VRAM 200 is Bypassed)

As shown in FIG. 14, video data input from the video port is stored in the line buffer 101 (step S211). Then, the interlaced data bypass circuit 501 directly sends the video data to the interface circuit for outputting display data (the color space converter 104, multiplexer 106, and DAC 107) while bypassing the VRAM 200 (step S212). The video data is converted from YUV data into RGB data by the color space converter 104 (step S213). The filter circuit in the graphics controller 105 converts graphics data (on-screen data) in the on-screen area 200B from noninterlaced data into interlaced data (step S214).

Then, the bypass data converted into RGB data and the on-screen data converted into interlaced data are then combined by the multiplexer 106 (step S215), and the combined data is interlaced-displayed on the CRT or TV (step S216).

Note that the processing in steps S214 and S215 can be omitted if video data alone is displayed.

Figure 15:
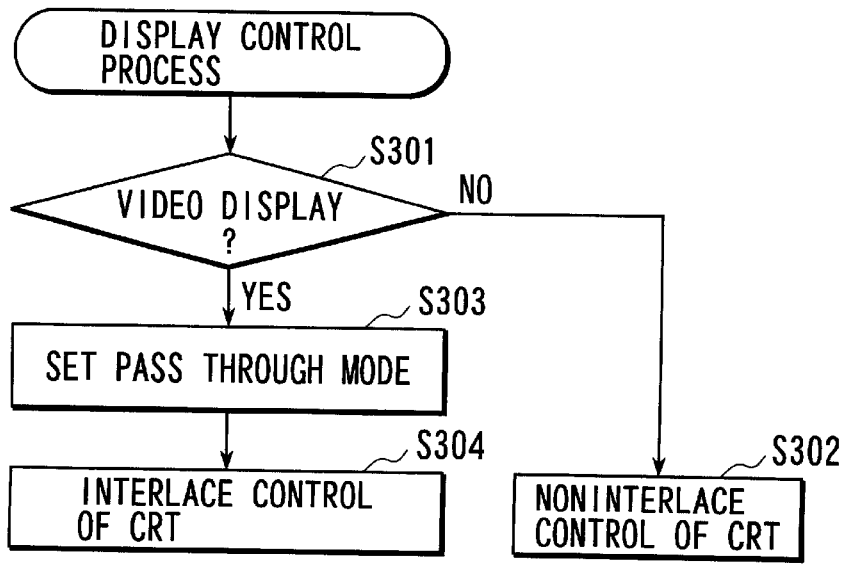
FIG. 15 is a flow chart showing the flow of display mode switching used in the embodiment shown in FIG. 11.

FIG. 15 is a flow chart showing the processing sequence of a VGA driver as a program for controlling the VGA controller 100.

Upon reception of an instruction for displaying interlaced video data from an application or the like (step S301), the VGA driver sets the aforementioned video mode setup in the interlaced display mode by setting parameters in registers of the graphics controller 105 to switch the control of the CRT from the noninterlaced display mode to the interlaced display mode, and also sets the VGA controller 100 in the pass through mode (step S303). With this control, the input video data is sent to the CRT as interlaced display data, and the CRT displays that display data under interlaced control (step S304).

Upon displaying data other than interlaced data, the VGA driver controls the VGA controller 100 to noninterlaced-control the CRT as in common control (step S302).

Such display mode switching among different video sources can also be automatically done in the VGA controller 100. For example, such automatic switching is implemented as follows. That is, the interlaced data bypass circuit 501 or the like checks if interlaced video data is input, and upon detection of interlaced video data, corresponding parameters are set in registers of the graphics controller 105 by hardware.

The embodiments have exemplified the VGA controller used in the personal computer. However, generation of noninterlaced data by appending line data of a predetermined color, or display control in the pass through mode can be applied to display control of a wordprocessor, workstation, set top box, home DVD player, game machine, and the like.

In the embodiments shown in FIGS. 1, 8, and 11, additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus comprising:
   input means for inputting interlaced data; and
   noninterlaced data generation means for generating noninterlaced data by alternating lines of the input interlaced data with lines of data of a predetermined color, wherein said color is selected independently of the input interlaced data.

2. The apparatus according to claim 1, wherein when the input interlaced data is even field data, said noninterlaced data generation means appends the interlaced data of the predetermined color to the input interlaced data as interlaced data for an odd field, and when the input interlaced data is odd field data, said noninterlaced data generation means appends the interlaced data of the predetermined color to the input interlaced data as interlaced data for an even field.

3. The apparatus according to claim 1, wherein said noninterlaced data generation means appends black or equivalent color data as the interlaced data of the predetermined color.

4. The apparatus according to claim 1, wherein said noninterlaced data generation means uses black data, which serves as blanking data of display data to be output to a display device, as the interlaced data of the predetermined color, and
   the blanking data is output to the display device for each one of odd and even line data contained in the input interlaced data as the other of odd and even line data.

5. An apparatus according to claim 1, further comprising:
   means for outputting the noninterlaced data generated by said noninterlaced data generation means, and noninterlaced-displaying the noninterlaced data.

6. An apparatus for displaying display data on a display device capable of noninterlaced/interlaced display, comprising:
   a port for receiving interlaced display data;
   a video memory for storing the interlaced display data received by the port when a display mode of the display device is set to a noninterlace mode; and
   means for transferring the interlaced display data received by the port to the display device with bypassing the video memory when the display mode of the display device is set to an interlace mode and supplying the interlaced display data read from the video memory to the display device when the display mode of the display device is set to the noninterlace mode.

7. The apparatus according to claim 6, further comprising a video memory and wherein the means for outputting the video data directly transfers the interlaced display video data received from the port, to the display device bypassing the video memory.

8. The apparatus according to claim 7, wherein said means for outputting includes:
   means for writing noninterlaced display graphics data into said video memory;
   means for converting noninterlaced display graphics data written in said video memory into interlaced graphic data; and
   means for combining the interlaced graphics data, and the interlaced display video data input from said port, and
   said means for outputting interlaced-displays the combined data on the display device.

9. The apparatus according to claim 6, further comprising a video memory and wherein the means for outputting the interlaced display video data writes the interlaced display video data received from the port into the video memory.

10. The apparatus according to claim 9, wherein the interlaced display video data input from said port is written in an off-screen area of said video memory, and
    display data output means includes:
    means for writing noninterlaced display graphics data into said video memory;
    means for converting noninterlaced display graphics data written in an on-screen area of said video memory into interlaced graphics data; and
    combining means for combining the interlaced graphics data, and the interlaced display video data read from the off-screen area of said video memory, and said display data output means interlaced-displays the combined data on the display device.

11. A method for noninterlaced-displaying interlaced data on a display device, comprising the steps of:
    inputting interlaced data; and
    generating noninterlaced data by alternating lines of the input interlaced data with lines of data of a predetermined color, wherein said color is selected independently of the input interlaced data.

12. The method according to claim 11, wherein the step of appending the interlaced data of the predetermined color to the input interlaced data, comprising the steps of:
    appending the interlaced data of the predetermined color to the input interlaced data as interlaced data for an odd field when the input interlaced data is even field data.

13. The method according to claim 11, wherein the step of appending the interlaced data of the predetermined color to the input interlaced data, comprising the steps of:
    appending the interlaced data of the predetermined color to the input interlaced data as interlaced data for an even field when the input interlaced data is odd field data.

14. The method according to claim 11, wherein black or equivalent color data is appended as the interlaced data of the predetermined color.

15. The method according to claim 11, wherein black data, which serves as blanking data of display data to be output to a display device, is used as the interlaced data of the predetermined color, and outputting the blanking data to the display device for each one of odd and even line data contained in the input interlaced data as the other of odd and even line data.

16. The method according to claim 11, further comprising the step of:

noninterlaced-displaying the noninterlaced data on the display device.

17. A method of controlling a display control apparatus which includes a video memory, and a display device capable of noninterlaced/interlaced display, comprising:

receiving interlaced display data;

writing the interlaced display data into the video memory when a display mode of the display device is set to a noninterlace mode; and transferring the received interlaced display to the display device with bypassing the video memory when the display mode of the display device is set to an interlace mode and supplying the interlaced display data read from the video memory to the display device when the display mode of the display device is set to the non-interlace mode.

18. The method according to claim 17, wherein the output step directly transfers the input interlaced display image data to the display data output means by bypassing the video memory.

19. The method according to claim 18, further comprising the step of:

interlaced-displaying the interlaced display image data on the display device.

20. The method according to claim 17, wherein the output step writes the input interlaced display image data in the video memory as interlaced data.

21. The method according to claim 20, further comprising the step of:

outputting the image data written as the interlaced data in said video memory to the display device, and interlaced-displaying the image data.

22. An apparatus comprising:

input means for inputting interlaced data;

noninterlaced data generation means for generating non-interlaced data by appending interlaced data of a predetermined color to the interlaced data input by said input means;

a color space converter for converting a color space of the noninterlaced data output from said noninterlaced data generation circuit from a YUV format into an RGB format;

a video memory including an off-screen area on which the noninterlaced data output from said noninterlaced data generation circuit is written, and an on-screen area on which graphics data is written;

a graphics controller for controlling the graphics data output from said video memory;

a multiplexer for selecting one of the noninterlaced data output from said color space converter and the graphics data output from said graphics controller, or combining the noninterlaced data on the graphics data; and a D/A converter for converting an output from said multiplexer into an analog RGB signal.

23. An apparatus comprising:

input means for inputting interlaced data; and noninterlaced data generation means for generating non-interlaced data by combining the input interlaced data with data of a predetermined color selected without regard to the input interlaced data, wherein the predetermined color data is selected in units of lines using a multiplexer, so that dummy data is appended to each one of odd line data and even line data contained in the interlaced data as the other of odd and even line data.

24. An apparatus for displaying display data on a display device capable of at least one of noninterlaced display and interlaced display, comprising:

a port for receiving interlaced display video data from an external source;

means for switching a display mode for controlling the display device from a noninterlaced display mode to an interlaced display mode when the interlaced display video data input from said port is displayed, wherein an interlaced data of a predetermined color is appended as dummy data to the received interlaced video data; and means for outputting the interlaced display video data received from the port to the display device.

25. A method for noninterlaced displaying of interlaced data on a display device, comprising:

inputting interlaced data; and generating noninterlaced data by combining the input interlaced data with data of a predetermined color selected without regard to the input interlaced data, wherein the predetermined color data is selected in units of lines using a multiplexer, so that dummy data is appended to each one of odd line data and even line data contained in the interlaced data as the other of odd and even line data.

26. A method applied to a display control apparatus, which includes a video memory and display data output means for outputting display data to a display device capable of at least one of noninterlaced display and interlaced display, comprising:

switching a display mode for controlling the display device from a noninterlaced display mode to an interlaced display mode when interlaced display image data input from an external source is displayed, wherein an interlaced data of a predetermined color is appended as dummy data to the received interlaced video data; and outputting the input interlaced display image data to the display output means.

* * * * *